Patented Feb. 4, 1947

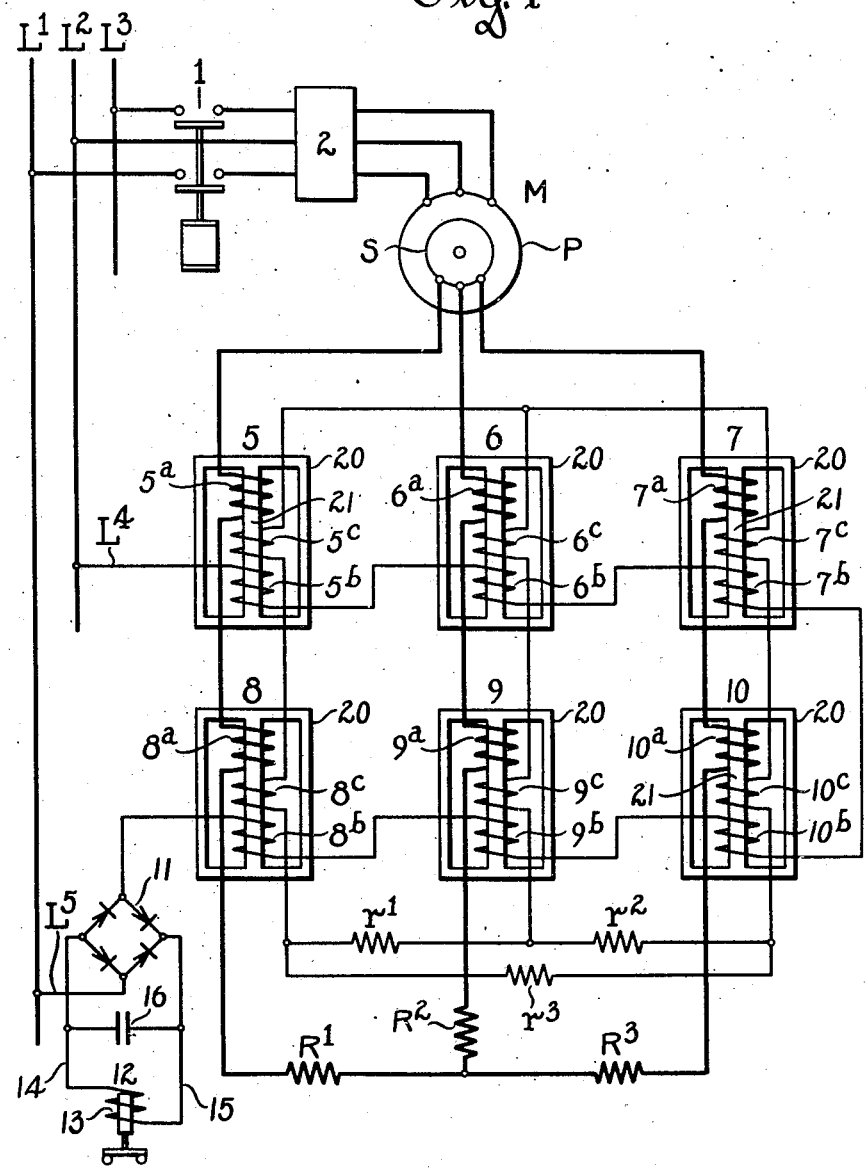

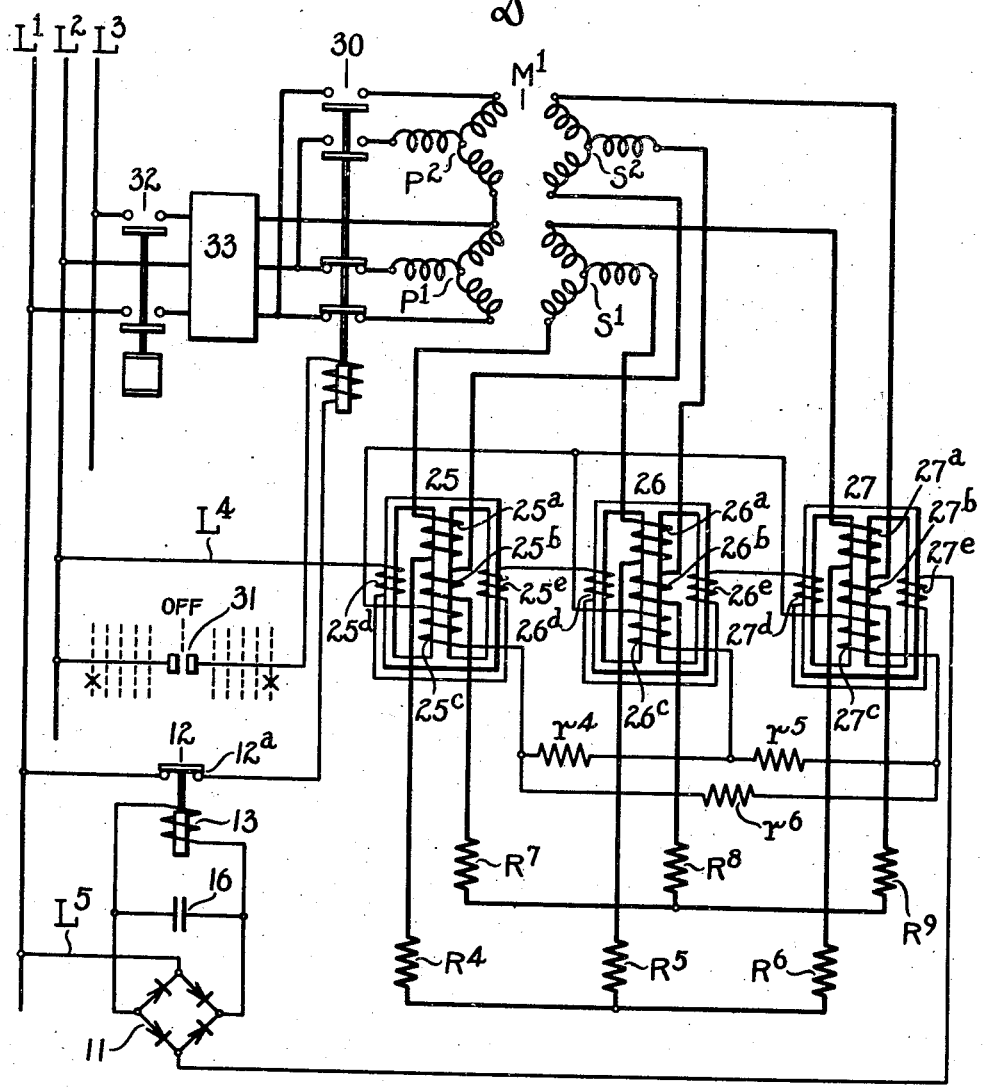

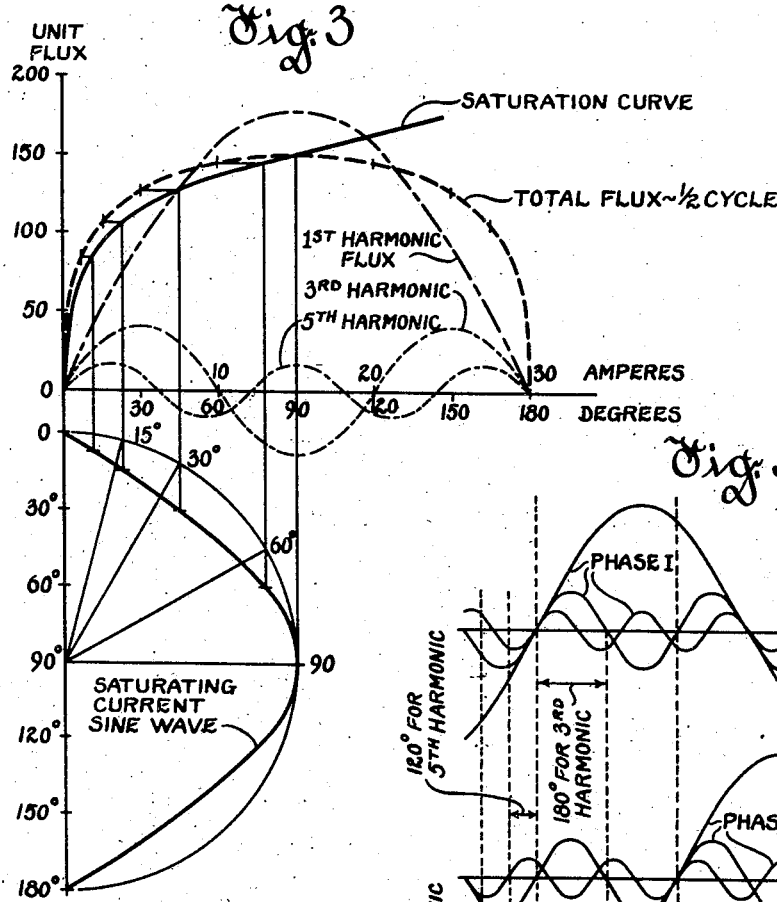
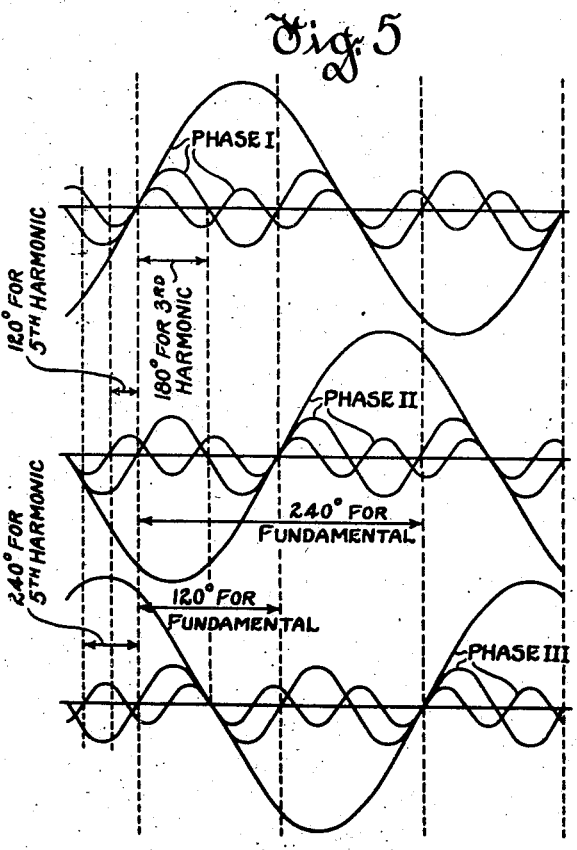
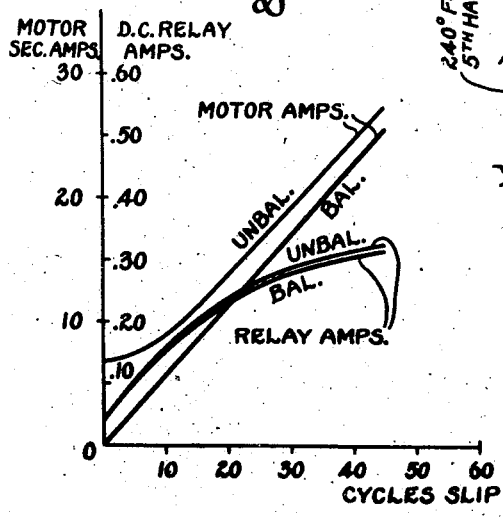

2,415,189

UNITED STATES PATENT OFFICE 2,415,189

INDUCTION MOTOR LOAD RELAY SYSTEM

Eric Pell, Shorewood, Wis., assignor to Cutler-Hammer, Inc., Milwaukee, Wis., a corporation of Delaware Application May 19, 1945, Serial No. 594,658

14 Claims. (Cl. 172—274)

This invention relates to load relays and more particularly to load relays for induction motors.

In practice a load relay to function within close limits and close to synchronous speed of the motor is often desired as for controlling transfer of a multi-speed motor from one set of operating windings to another, and the present invention has among its objects to provide a load relay especially adapted to such use but not limited thereto.

Another object is to provide such a load relay for control by the electrical condition of the motor secondary or rotor circuit.

Another object is to provide for a saturable reactor type of relay utilizing the motor rotor current for control of saturation, means for neutralizing the inductive effects which otherwise would impair its action and reliability.

Another object is to provide such a relay with means whereby it may be satisfactorily employed for a motor operating with its primary subjected to unbalanced voltages, as is highly desirable in hoist service where the motor is operating under overhauling load conditions.

Another object is to provide a relay which may be embodied in a number of specifically different forms.

Other objects and advantages of the invention will hereinafter appear.

Certain embodiments of the invention are illustrated in the accompanying drawings, and the same will now be described, it being understood that the invention is susceptible of embodiment in other forms without departing from the scope of the appended claims.

In the accompanying drawings:

Figure 1 shows diagrammatically in conjunction with a motor one form of relay, but without depicting any specific use of the relay.

Fig. 2 shows a modified form of relay in conjunction with a two-speed induction motor having separate sets of windings for its different speeds, the relay being depicted as employed for controlling transfer from one set of windings to another, and Figs. 3, 4 and 5 depict certain characteristic curves hereinafter referred to.

Referring to Fig. 1, the same shows schematically an induction motor M having its primary P supplied with power from alternating current supply lines $L^1$, $L^2$, $L^3$ through a suitable main switch 1 and any suitable controller 2, such for example as the now commercial controller for effecting motor reversals and unbalancing of the voltages to which the primary is subjected under overhauling load conditions. The motor is shown as having in circuit with its secondary or rotor S resistors $R^1$, $R^2$ and $R^3$, one for each phase of the circuit, which resistors are shown as being star connected. As will be understood, the controller 2 may comprise means for excluding the resistors $R^1$, $R^2$ and $R^3$ in the usual manner when desired.

The relay illustrated in Fig. 1 comprises a set of saturable reactors 5, 6 and 7, one for each phase of the motor secondary circuit, and a second set of identical reactors 8, 9 and 10 coacting with the reactors 5, 6 and 7, respectively, to neutralize in their impedance coils undesired inductive effects when their saturating coils are supplied with a three phase alternating current. The reactors are employed to vary the impedance of a single phase circuit $L^4$, $L^5$ supplied from lines $L^1$, $L^2$, respectively, and including a rectifier 11 through which said single phase circuit supplies a sensitive direct current switch or relay 12 shown as of the normally closed type and having an operating winding 13 connected to rectifier 11 by conductors 14 and 15. Preferably the rectifier 11 is of the full wave type and preferably it is paralled by a condenser 16, both provisions being advantageous for a more continuous supply of current to the winding 13.

As will be understood, the relay 12 may be employed for any of a number of different purposes including that depicted in Fig. 2. Thus in considering Fig. 1 the use made of the relay 12 will be neglected, but it will be assumed that it is desired to have the switch or relay 12 open when the secondary current of the motor exceeds a certain relatively low value, and to reclose only when the secondary current is reduced to a predetermined lower value such as that representing some desired change in operation, or a close approach of the motor to synchronous speed.

The several saturable reactors 5, 6 and 7 are of like form and except for having alternating current saturating coils are in general similar to the common form of saturable reactor having direct current saturating coils. Each reactor comprises a rectangular magnetic frame 20 with central leg 21 carrying the several coils of the reactor. Reactors 5, 6 and 7 are respectively provided with saturating coils $5^a$, $6^a$ and $7^a$, which coils are connected in the different phases of the motor secondary circuit, each in series with one of the resistors $R^1$, $R^2$, $R^3$. These coils function to afford varying saturation of their respective magnetic frames for varying the impedance value of the coils $5^b$, $6^b$ and $7^b$ of reactors 5, 6 and 7, respectively. The coils $5^b$, $6^b$ and $7^b$ are included in series in the single phase circuit $L^4$, $L^5$ from which the direct current supplied to relay 12 is derived. The reactors 5, 6 and 7 as thus far described would control the relay 12 similarly to the widely used D.-C.-A. C. reactors except for the undesired induced effects of certain harmonics of currents and fluxes resulting from supply of the coils $5^a$, $6^a$ and $7^a$ with three phase alternating current, which as explained is the current of motor secondary circuit.

With the coils $5^a$, $6^a$ and $7^a$ supplied with sinusoidal currents, the periodic alternating flux of reactors 5, 6 and 7 will, because of the non-linear permeability of the iron cores, take on a non-sinusoidal wave shape as shown in Fig. 3. An analysis of this flux wave would disclose it as composed of one fundamental sine wave and several higher odd harmonics. No even harmonics are present, unless the reactor cores possess residual magnetism. The first, third and fifth of these harmonics are depicted in Fig. 3 in relation to the total flux curve for a half cycle, as is the saturating current sine wave and the saturation curve from which the flux wave is constructed. Higher odd harmonics, although not individually shown are, of course, present in the flux wave.

The inductive effect of all these harmonics must be neutralized in the various coils of the reactors. The first harmonic and other odd harmonics except the third and its multiples are neutralized by providing like reactors in the different phases of the motor secondary. This is possible because the first harmonic comprises three components displaced 120 degrees, whereby the provision of a reactor for each of the three phases of the motor secondary results in cancelling out the effects of this harmonic on the series connected impedance coils. All other odd harmonics which are not multiples of the third, i. e., the fifth, seventh, eleventh, thirteenth, etc., are also neutralized by this connection since the components of each are displaced 120 degrees, as depicted in Fig. 5. On the other hand, the third harmonic comprises components which are in phase and are not neutralized as in the case of the first harmonic. However, the provision of the additional set of reactors 8, 9 and 10 affords a way of neutralizing such harmonic and multiples thereof.

The reactors 8, 9 and 10 are like the reactors 5, 6 and 7, but their impedance coils $8^b$, $9^b$ and $10^b$ are 180 degrees out of phase with the impedance coils $5^b$, $6^b$ and $7^b$ of reactors 5, 6 and 7, all of said windings being connected in series relation. The saturating coils $8^a$, $9^a$ and $10^a$ are in series with the coils $5^a$, $6^a$ and $7^a$, respectively, of reactors 5, 6 and 7, and with the arrangement described it has been found that the third harmonic and its multiples are effectively neutralized to enable very satisfactory control of the impedance of the single phase current by saturation control of the reactors as a function of the varying current of the motor secondary or rotor circuit. As depicted in Fig. 4, it is possible to obtain within a low range of motor slip when the motor operates under balanced conditions of its primary an ampere curve for the relay 12 substantially paralleling that of the motor amperes.

However, as depicted in Fig. 4, where the motor primary is subjected to unbalanced voltages with a resultant negative sequence component of the secondary current to which the saturating windings of the reactors are subjected, the curve of motor secondary amperes flattens out within the lower range of slip and some special provision is required to preserve for the relay amperes a curve approximating that obtained under balanced motor primary conditions. Such provision can be made by use of additional coils $5^c$ to $10^c$ on reactors 5 to 10, respectively, as illustrated. Coils $5^c$, $6^c$ and $7^c$ are connected in series with coils $8^c$, $9^c$ and $10^c$, respectively, and the pairs of series connected coils are short-circuited in delta relation with impedances $r^1$, $r^2$ and $r^3$. These coils are subjected to induced voltages as a function of the aforementioned negative sequence component of relatively high frequency and are utilized to buck out the negative sequence saturating flux to substantially preserve the relay ampere curve as depicted in Fig. 4. Because of its relatively low frequency the positive sequence component of the current and flux is not materially affected by the aforementioned means employed to neutralize the effects of the negative sequence component. As will be understood, the bucking action of these additional coils will be determined by the selected values of resistors $r^1$, $r^2$ and $r^3$.

Referring to Fig. 2, the load relay shown therein is basically the same as that shown in Fig. 1 but is modified to reduce the number of reactors required and to adapt them to a two-speed motor $M^1$ having separate sets of windings for low speed and high speed. In this instance there are only three reactors 25, 26, 27, one for each phase of the motor secondary circuit and each adapted to be used for either the slow speed secondary circuit or the high speed secondary circuit. The high and the low speed windings of the motor preferably are relatively non-inductive, i. e., the summation of the voltages induced in the various coils of one winding by the flux of the other winding is zero at the terminals of the unexcited winding.

Each of reactors 25, 26 and 27 comprises a magnet frame similar to those of Fig. 1, but in this instance only the saturating and neutralizing coils are mounted on the center leg, the impedance coils being mounted on outside legs. The three reactors have saturating coils $25^a$, $26^a$ and $27^a$, respectively, for inclusion in the slow speed secondary circuit of the motor, and with saturating coils $25^b$, $26^b$ and $27^b$, respectively, for connection in the high speed secondary circuit of the motor. The coils $25^a$, $26^a$ and $27^a$ are respectively connected in series with resistors $R^4$, $R^5$ and $R^6$ which are star connected, while the coils $25^b$, $26^b$ and $27^b$ are respectively connected in series with resistors $R^7$, $R^8$ and $R^9$ which are also star connected. The neutralizing coils $25^c$, $26^c$ and $27^c$ have connections similar to those of Fig. 1, inclusive of delta connected impedances $r^4$, $r^5$ and $r^6$. In this instance the reactors 25, 26 and 27 are respectively provided with two impedance coils $25^d$—$25^e$, $26^d$—$26^e$, $27^d$—$27^e$, each pair of these coils being mounted on the outer legs of the respective magnetic frame. All impedance coils of the three reactors are connected in series relation in a single phase circuit as in the form of relay shown in Fig. 1, and the two impedance coils of each reactor are connected in a bucking relation. Thus each reactor may be likened to any one of the main reactors of Fig. 1, plus the corresponding additional reactor having its impedance coil in a bucking relation to that of the corresponding main reactor, and as a consequence each dual reactor of Fig. 2 will inherently tend to neutralize the third harmonic and all multiples thereof. As in Fig. 1, the inductive effect of the first harmonic and all higher odd harmonics not multiples of the third is neutralized by providing three of the dual reactors, one for each phase of the motor secondary, and the coils 25$^c$, 26$^c$ and 27$^c$ will neutralize, as in Fig. 1, the undesired fluxes resulting from operating the motor under unbalanced primary voltages. While in Fig. 2 each reactor has two saturating coils, said coils function selectively for low speed and high speed operation of the motor, wherefore this arrangement can be said to save three magnetic frames and three reactor coils as compared with the arrangement of Fig. 1.

The single phase circuit including the impedance coils is like that shown in Fig. 1 and has been given the same reference characters, as have also the double wave rectifier 11, the relay 12 and condenser 16. In this instance the normally closed contacts 12$^a$ of relay 12 are shown as employed to control the operating winding of a selector switch 30 for the slow and high speed windings of motor M$^1$. The switch 30 when deenergized selects the motor slow speed primary, and when energized selects the motor high speed primary, said switch being under the control of relay 12 jointly with master switch contacts 31. The master switch is assumed to be of the drum type movable from off position in opposite directions selectively, and said contacts 31 are normally disengaged subject to engagement only when the master switch is moved to extreme positions indicated by the crosses on certain of the broken lines indicating positions of the master switch when moved to either side of off position. Thus the slow speed motor primary is selected for starting and relay 12 responds upon starting to prevent selection of the high speed primary of the motor until the master switch 31 is closed, and until the relay 12 recloses as the motor approaches its slow synchronous speed, or when the load as measured by the secondary current assumes some predetermined value selected as safe for transferring to the high speed winding.

While further description of Fig. 2 is believed unnecessary, it may be pointed out that the motor slow speed windings comprise windings P$^1$ and S$^1$, while its high speed windings comprise windings P$^2$ and S$^2$, the switch 31 affording selection of the windings P$^1$ and P$^2$. Also there is shown for control of the motor primary a main switch 32 and in outline a suitable control panel 33 which may if desired comprise reversing means for the motor primary and unbalancing means for the motor primary, all under the control of the master switch of which the contacts 31 form a part. As will be apparent without tracing the circuits, the reactor coils 25$^a$, 26$^a$ and 27$^a$ are included in different phases of the motor secondary S$^1$, while the coils 25$^b$, 26$^b$ and 27$^b$ are connected in the different phases of the motor secondary S$^2$.

What I claim as new and desire to secure by Letters Patent is:

1. In combination, an induction motor, an electro-responsive device, means rendering said device responsive to load on said motor, said means comprising a control circuit for said device, and saturable reactor means subjected to the rotor current of said motor for varying saturation and affording as a function of varying saturation a varying impedance in the control circuit for said device.

2. In combination, an induction motor, an electro-responsive device, means rendering said device responsive to load on said motor, said means comprising a control circuit for said device, and saturable reactor means subjected to the rotor current of said motor for varying saturation and affording as a function of varying saturation a varying impedance in the control circuit for said device, said saturable reactor means comprising means substantially neutralizing undesired induced fluxes, thereby to cause said saturable reactor means to simulate the impedance varying action of saturable reactor means supplied with direct current for varying saturation.

3. In combination, an induction motor, a sensitive electroresponsive device, means rendering said device responsive to load on said motor, said means comprising a control circuit for said device, and saturable reactor means subjected to the rotor current of said motor for varying saturation and affording as a function of varying saturation a varying impedance in the control circuit for said sensitive device, said saturable reactor means comprising neutralizing means for undesired induced fluxes thereby to render said device sensitive to load value when said motor is operating close to synchronous speed.

4. In combination, an induction motor, an electroresponsive device for response to load on said motor, a single phase alternating current circuit including a rectifier through which said electroresponsive device is supplied direct current for energization thereof, and saturable reactor means subjected to the rotor current of said motor for varying saturation and affording as a function of varying saturation a varying impedance in said single phase circuit supplying said device.

5. In combination, an induction motor, an electro-responsive device for response to load on said motor, a single phase alternating current circuit including a rectifier through which said electroresponsive device is supplied direct current for energization thereof, and saturable reactor means subjected to the rotor current of said motor for varying saturation and affording as a function of varying saturation a varying impedance in said single phase circuit supplying said device, said saturable reactor means comprising neutralizing means for undesired induced fluxes thereby to cause said saturable reactor means to closely simulate the impedance varying action of saturable reactor means supplied with direct current for variable saturation.

6. In combination, a polyphase induction motor, an electroresponsive device for response to load on said motor, a control circuit for said device, and saturable reactor means subjected to the rotor current of said motor for varying saturation and affording as a function of varying saturation a varying impedance in said control circuit for said device, said saturable reactor means comprising a plurality of like component parts individualized to the different phases of the motor secondary circuit in respect of their saturating coils and having their impedance coils connected in series.

7. In combination, a polyphase induction motor, an electroresponsive device for response to load on said motor, a control circuit for said device, and saturable reactor means subjected to the rotor current of said motor for varying saturation and affording as a function of varying saturation a varying impedance in said control circuit of said device, said saturable reactor means comprising a plurality of like component parts individualized to the different phases of the motor secondary circuit in respect of their saturating coils and having their impedance coils all connected in series, with a pair of impedance coils for each phase of the motor secondary circuit in bucking relation.

8. In combination, an induction motor, an electroresponsive device for response to load on said motor, a control circuit for said device, and saturable reactor means subjected to the rotor current of said motor for varying saturation and affording as a function of varying saturation a varying impedance in said control circuit for said device, said saturable reactor means comprising neutralizing means for the flux produced therein as a function of negative sequence flux resulting from operation of said motor with its primary subjected to unbalanced voltages.

9. In combination, a polyphase induction motor, an electroresponsive device for response to load on said motor, a control circuit for said device, and saturable reactor means subjected to the rotor current of said motor for varying saturation and affording as a function of varying saturation a varying impedance in said control circuit of said device, said saturable reactor means comprising a plurality of like component parts individualized to the different phases of the motor secondary circuit in respect of their saturating coils and having their impedance coils all connected in series, with a pair of impedance coils for each phase of the motor secondary circuit in bucking relation, and said saturable reactor means also comprising neutralizing means for the flux produced therein as a function of negative sequence flux resulting from operation of said motor with its primary subjected to unbalanced voltages.

10. In combination, a polyphase alternating current circuit, an electroresponsive device, means rendering said device sensitive to the electrical condition of said circuit, said means comprising a control circuit for said device, and saturable reactor means subjected to the current of said circuit for varying saturation and affording as a function of varying saturation a varying impedance and consequent current control in said control circuit for said device independent of frequency of said polyphase circuit, said saturable reactor means comprising like component parts individualized to the different phases of said circuit in respect of their saturating coils and having their impedance coils in series relation.

11. In combination, a polyphase alternating current circuit, an electrorepsonsive device, means rendering said device sensitive to the electrical condition of said circuit, said means comprising a control circuit for said device, and saturable reactor means subjected to the current of said circuit for varying saturation and affording as a function of varying saturation a varying impedance in said control circuit for said device, said saturable reactor means comprising like component parts individualized to the different phases of said circuit in respect of their saturating coils, and each of said component parts having a pair of bucking impedance coils connected in series with one another and with the corresponding coils of the other component parts of said saturable reactor means.

12. In combination, a polyphase alternating current circuit, a single phase alternating current circuit including a double wave rectifier, an electroresponsive device supplied with direct current from said single phase circuit through said rectifier, a plurality of saturable reactors having their impedance coils in series in said single phase circuit, there being a saturable reactor for each phase of said polyphase circuit and each such reactor having a saturating coil subjected to the current of its respective phase of said polyphase circuit.

13. In combination, a polyphase alternating current circuit, a single phase alternating current circuit including a double wave rectifier, an electroresponsive device supplied with direct current from said single phase circuit through said rectifier, a plurality of saturable reactors having their impedance coils in series in said single phase circuit, there being a saturable reactor for each phase of said polyphase circuit and each such reactor having a pair of impedance coils in bucking relation and a saturating coil subjected to the current of its respective phase of said polyphase circuit.

14. In combination, a polyphase alternating current circuit, a single phase alternating current circuit including a double wave rectifier, an electroresponsive device supplied with direct current from said single phase circuit through said rectifier, a plurality of saturable reactors having their impedance coils in series in said single phase circuit, there being a double saturable reactor for each phase of said polyphase circuit, the component parts of each having their impedance coils in opposed relation and having series connected saturating coils subjected to the current of their respective phase of said polyphase circuit.

ERIC PELL.